Patented June 6, 1933

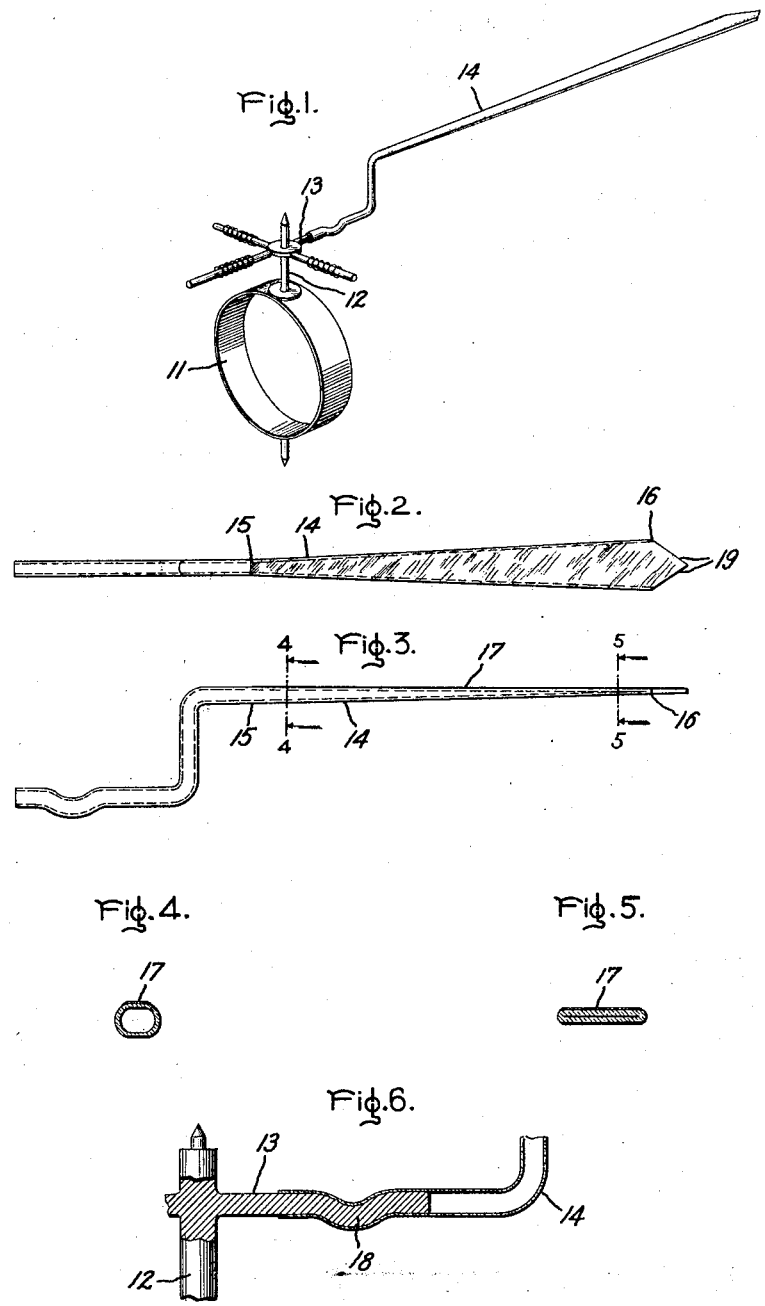

1,913,201

UNITED STATES PATENT OFFICE

EDWARD G. HAVEN, OF SCOTIA, NEW YORK, ASSIGNOR TO GENERAL ELECTRIC COMPANY, A CORPORATION OF NEW YORK

INSTRUMENT POINTER

Application filed September 23, 1932. Serial No. 634,545.

My invention relates to indicating instruments and pointers therefor. Its principal object is to provide pointers of increased strength and rigidity and diminished tendency to vibrate.

Another object of my invention is to provide a pointer for which there will be no frequency within the range of frequencies of vibration to which aircraft instruments are subjected, at which the amplitude of vibration is greater than at any other frequency, and for which the amplitude of vibration at all frequencies is relatively very small.

It is a further object of my invention to produce a pointer for indicating instruments having a construction which provides sufficient strength and rigidity to permit carrying a relatively thick coating of luminous paint. Still another object of my invention is to provide an indicating pointer and a method of attaching to indicating instruments which will permit the use of such instruments on board aircraft and in other applications in which the instruments are subjected to severe vibrations. Other and further objects will become apparent as the description proceeds.

In accordance with my invention in its preferred form, I utilize a length of seamless tubing to form the pointer for an indicating instrument. One end of the tubing is slipped over the cross arm of the moving element of the indicating instrument and is secured to the cross arm by forming a bend in the cross arm and the portion of the tubing where they overlap. The indicating tip of the pointer is formed by flattening the tip and trimming the tip to a point. Care is taken to cause the pointer to be flattened gradually from an intermediate point to the indicating tip in order that there will be no weak point between the normal tubular section and the flattened portion in order that the material will be substantially uniformly strained throughout the length of the flattened portion. The features of my invention which I believe to be novel and patentable will be pointed out in the claims appended hereto.

In order to afford a more complete understanding of my invention, reference is made in the following description to the accompanying drawing in which Fig. 1 represents in perspective the moving element of an indicating instrument with an indicating pointer assembled thereon in accordance with my invention; Fig. 2 is a plan view of the pointer; Fig. 3 is an elevation of the pointer; Figs. 4 and 5 are views of cross sections taken at two points indicated in Fig. 3; and Fig. 6 is a view partially in cross section indicating the manner of securing the pointer to the cross arm of the movable element of the instrument.

It will be understood that my invention is applicable to any type of instrument having a moving element requiring an indicating pointer, but for the sake of setting forth more clearly the nature of my invention I have illustrated and described my invention in connection with the moving element of an electrical instrument having a movable coil 11 carried by a shaft 12. The shaft 12 also carries a cross arm 13 to which the pointer 14 is attached. The end of the pointer secured to the cross arm 13 is preferably substantially circular in section, but from the point 15 to the tip 16 shown in Fig. 2, the pointer is gradually flattened. Care is taken that there shall be no abrupt changes in the shape of the cross section at any point along the pointer in order that there will be no weak point and also in order that the material of which the pointer is composed will be uniformly strained along the portion which is gradually flattened. The tip 16 is completely flattened and preferably trimmed to a point to form an index which may cooperate with a scale, not shown.

Figs. 4 and 5 illustrate the cross sections cut by planes 4 and 5 indicated in Fig. 3. It will be observed that at plane 4 where there is relatively greater bending stress than at the end of the pointer, the pointer has relatively great depth, whereas at the plane 5 where there is negligible bending stress the pointer is almost completely flattened so as to have relatively little depth compared with its width. As is well known, the section of greater depth has greater strength with respect to bending stress and consequently the strength and rigidity of the pointer are increased by this construction. The increased rigidity provided by my construction also diminishes the tendency to vibrate. Obviously greater strength and rigidity are obtained than could be obtained from pointers punched from flat sheets.

In the case of instruments used on aircraft, for instance, on which the apparatus is subjected to severe vibrations which may vary in frequency up to approximately 2000 vibrations per minute, it is essential that the instrument pointers have substantially no tendency to be forced into vibration by vibrations of any frequency to which the apparatus may be subjected. As a result of the strength provided by my construction I am able to apply a relatively thick coating 17 of luminous paint, for example, without causing the pointer to be broken by the stresses which would be set up by vibration. The flattened surface also presents a relatively large area to view in the plane of its movement, making the pointer easily visible.

Referring to Fig. 6, the pointer is preferably attached to the cross arm 13 by swaging the cross arm to fit the inside of the pointer and bending the two by means of a special tool to produce the conformation shown. Preferably, the joint is cemented in order to further insure the absence of relative motion between the two parts and to increase rigidity. Preferably, the edges 19 of the tip of the pointer are sealed in order to reduce any tendency that there might be for the surfaces to separate and in order to increase further the rigidity of the pointer.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination with an indicating instrument having a movable element, a pointer therefor comprising a length of seamless circular tubing having one end attached to said movable element and the other end flattened in the plane of its movement and trimmed to a V-shaped tip to form an index, said tip being sealed to provide additional rigidity and said flattened portion being tapered gradually from a circular section to a fully flattened section with two sides in contact, thereby preventing the existence of a weak point between the flattened section and the circular section and causing the material along the length of the flattened portion to be strained uniformly.

2. In combination with an indicating instrument having a movable element, a cross arm attached to said movable element, and a pointer comprising a length of tubing having one end surrounding and secured to said cross arm and the other end flattened in the plane of its movement and trimmed to form a flat pointed tip, said pointer being gradually flattened from an intermediate portion to said tip so as to avoid any abrupt change in shape of the cross section, thereby preventing the existence of a weak point anywhere along said pointer and causing the material along the length of the gradually flattened portion to be strained uniformly.

3. In combination with an indicating instrument having a movable element, a cross arm attached to said movable element, and a pointer comprising a length of tubing having one end surrounding said cross arm and rigidly fastened thereto by forming a bend in the cross arm and the tubing together, in the portion where they overlap.

4. A pointer for an indicating instrument comprising a length of tubing having one end flattened and trimmed to form a flat pointed tip, said tubing being gradually flattened from an intermediate portion to said tip so as to avoid any abrupt change in shape of the cross section, thereby preventing the existence of a weak point anywhere along said pointer and causing the material along the length of the gradually flattened portion to be strained uniformly.

5. A pointer for an indicating instrument comprising a length of tubing having one end flattened and trimmed to form a flat pointed tip, the edges of the material forming said tip being sealed together in order to provide additional rigidity, said tubing being gradually flattened from an intermediate portion to said tip so as to avoid any abrupt change in shape of the cross section, thereby preventing the existence of a weak point anywhere along said pointer and causing the material along the length of the gradually flattened portion to be strained uniformly.

6. A pointer for an indicating instrument comprising a length of tubing having one end flattened and trimmed to form a flat pointed tip, said pointer being coated on one side with luminous paint, said tubing being gradually flattened from an intermediate portion to said tip so as to avoid any abrupt change in shape of the cross section, thereby preventing the existence of a weak point anywhere along said pointer and causing the material along the length of the gradually flattened portion to be strained uniformly, thereby providing sufficient strength to permit applying a relatively thick coating of luminous paint.

7. A pointer for an indicating instrument comprising a length of tubing having one end flattened and trimmed to form a flat pointed tip, the edges of the material forming said tip being sealed together in order to provide additional rigidity, said pointer being coated on one side with luminous paint, said tubing being gradually flattened from an intermediate portion to said tip so as to avoid any abrupt change in shape of the cross section, thereby preventing the existence of a weak point anywhere along said pointer and causing the material along the length of the gradually flattened portion to be strained uniformly, thereby providing sufficient strength to permit applying a relatively thick coating of luminous paint.

In witness whereof, I have hereunto set my hand.

EDWARD G. HAVEN.